US006614930B1

(12) United States Patent
Agnihotri et al.

(10) Patent No.: US 6,614,930 B1
(45) Date of Patent: Sep. 2, 2003

(54) VIDEO STREAM CLASSIFIABLE SYMBOL ISOLATION METHOD AND SYSTEM

(75) Inventors: Lalitha Agnihotri, Fishkill, NY (US); Nevenka Dimitrova, Yorktown Heights, NY (US); Jan Herman Elenbaas, New York, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/441,943

(22) Filed: Nov. 17, 1999

Related U.S. Application Data

(60) Provisional application No. 60/117,658, filed on Jan. 28, 1999.

(51) Int. Cl.[7] .............................. G06K 9/34; G06K 9/40; G06K 9/62

(52) U.S. Cl. ..................... 382/176; 382/180; 382/173; 382/224; 382/264

(58) Field of Search ................................ 382/173, 176, 382/177, 180, 204, 205, 254, 264, 257, 266, 199, 203, 218, 224, 260; 358/462

(56) References Cited

U.S. PATENT DOCUMENTS

| | | | | |
|---|---|---|---|---|
| 4,965,763 A | * | 10/1990 | Zamora | 382/176 |
| 5,091,964 A | * | 2/1992 | Shimomura | 382/176 |
| 5,278,918 A | * | 1/1994 | Bernzott et al. | 382/176 |
| 5,568,571 A | * | 10/1996 | Willis et al. | 382/254 |
| 5,774,579 A | * | 6/1998 | Wang et al. | 382/176 |
| 5,852,678 A | * | 12/1998 | Shiau et al. | 382/176 |
| 5,892,843 A | * | 4/1999 | Zhou et al. | 382/176 |
| 6,009,196 A | * | 12/1999 | Mahoney | 382/176 |
| 6,128,414 A | * | 10/2000 | Liu | 382/266 |
| 6,327,385 B1 | * | 12/2001 | Kamitani | 382/177 |
| 6,366,699 B1 | * | 4/2002 | Kuwano et al. | 382/199 |

FOREIGN PATENT DOCUMENTS

| | | | | |
|---|---|---|---|---|
| EP | 0473476 A1 | 3/1992 | ............ | G06F/15/68 |
| EP | 0720114 A3 | 7/1996 | ............ | G06K/9/20 |
| EP | 0720114 A2 | 7/1996 | ............ | G06K/9/20 |

OTHER PUBLICATIONS

"Convias: Content–based Image and Video Access System", by Mohammed Abdel–Mottaleb et al., Proceedings of ACM Multimedia, 1996, pp. 427–428.

"VideoQ: An Automated Content Based Bideo Search System Using Visual Cues" by Shih–fu Chang et al., Proceedings of AMC Multimedia, 1994, pp. 313–324.

"Informedia Digital Video Library", by M. Christel et al., vol. 38, No. 4, 1995, pp. 57–58.

"Viedo Content Magnagement in Consumer Devices", by Nevenka Dimitrova et al., IEEE Transactions on Knowledge and Data Engineering, vol. 10, No. 6, 1998, pp. 988–995.

"Indexing Text Events in Digital Video Databases", by U. Gargi et al., International conference on Pattern Recognition, Aug. 1998, pp. 916–918.

"Image Indexing Using Moments and Wavelets", by M.K. Mandal et al., IEEE Transactions on Consumer Electronics, vol. 42, No. 3, Aug. 1996, pp. 557–565.

(List continued on next page.)

Primary Examiner—Andrew W. Jones
Assistant Examiner—Amir Alavi
(74) Attorney, Agent, or Firm—Edward W. Goodman

(57) ABSTRACT

An image processing device and method for classifying symbols relies on a connected-component technique for isolating symbol regions. The device and method form connected components from an image derived by the application of an edge detection filter. The formation of connected components from this filtered image defines the edges of character shapes. As a result, the number of pixels that must be connected to define each connected component is substantially reduced and the speed of processing thereby increased. The application of the method is discussed primarily with respect to text in a video stream.

16 Claims, 12 Drawing Sheets

OTHER PUBLICATIONS

"Abstracting Digital Movies Automatically", by S. Pfeiffer et al., Journal on Visual Communications and Image Representation, vol. 7, No. 4, 1996, pp. 345–353.

"On the Dectection and Recognition of Television Commercials", by R. Lienhart et al., Proceedings of IEEE International Conference on Multimedia Computing and Systems, 1996, pp. 509–516.

"Parsing TV Programs for Identification and Removal of Non–Story Segments", T. McGee et al., SPIE Conference on Storage and Retrieval in Image and Video Databases, 1999, pp. 243–251.

"Recognizing Characters in Scene Images", by Ohya et al., IEEE Transactions on Pattern Analysis and Machine Intelligence, vol. 16, 1994, pp. 214–224.

"Text, Speech, and Vision for Video Segmentation: The Informedia Project", by A. Hauptmann et al., AAAI Fall 1995, Symposium on Computational Models for Integrating Language and Vision.

"Automatic" Text Recognition in Digital Videos, by R. Lienhart et al., SPIE Conference on Image and Video Processing, SPIE vol. 2666, pp. 180–188.

"Automatic Text Location in Images and Video Frames" by A.K. Jain et al., Proceedings of IEEE Pattern Recognition, vol. 31, 1998, pp. 2055–2976.

"Automatic Text Extraction from Video for Content–Based Annotation and Retrieval", by J.C. Shim et al., Proceedings of the International Conference on Pattern Recognition, pp. 618–620, 1998.

"A Spatial Thresholding Method for Image Segmentation", by K.V. Mardia et al., IEEE Transactions on Patterns Analysis and Machine Intelligence, vol. 10, 1988, pp. 919–927.

"An Iterative Thresholding Algorithm for Image Segmentation" by A. Perez et al., IEEE Transactions on Pattern Analysis and Machine Intelligence, vol. 9, 1987, pp. 742–751.

"Digital Image Processing" by R.C. Gonzalez et al., Addison–Wesley Publishing Co., 1992, pp. 191–192.

* cited by examiner

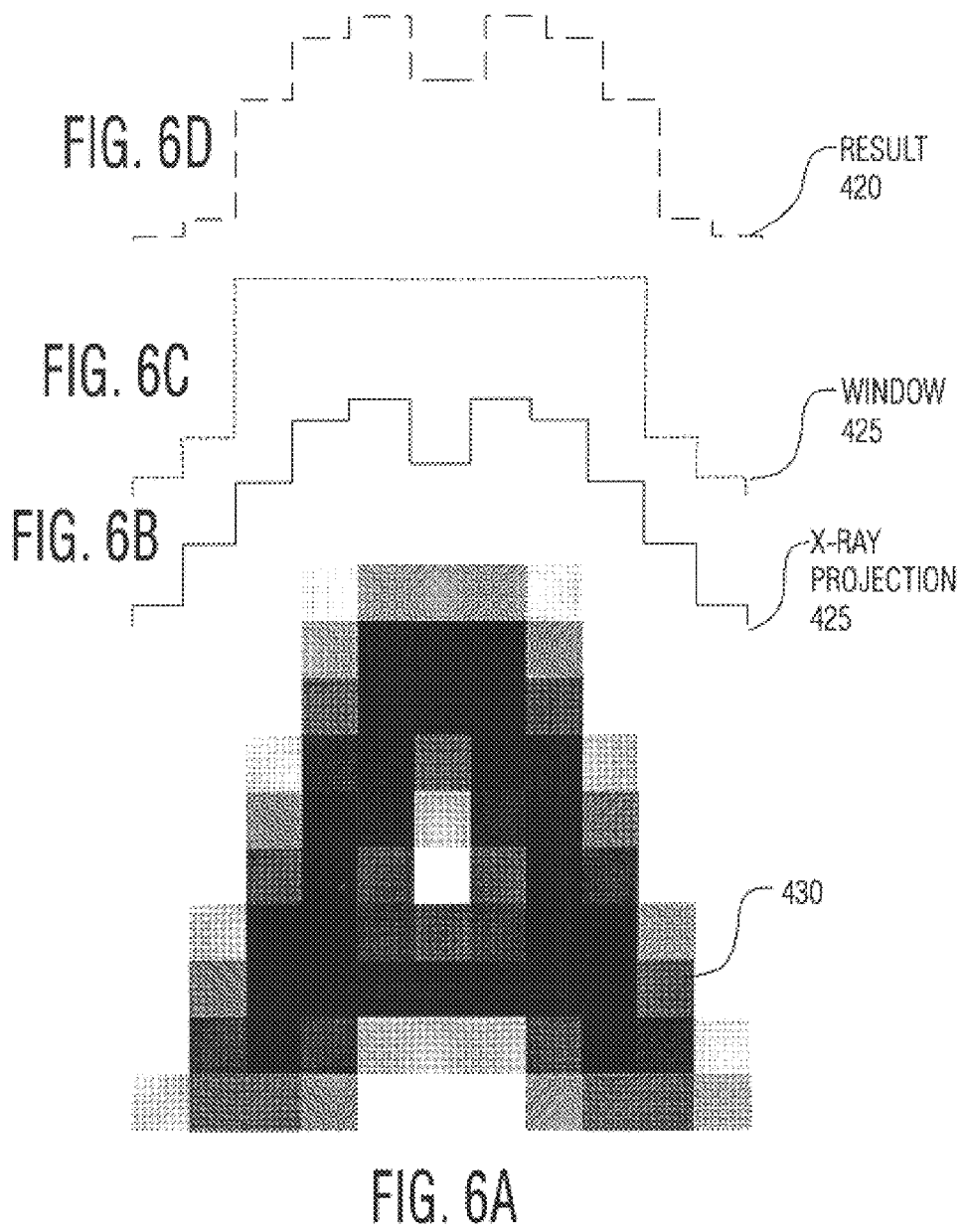

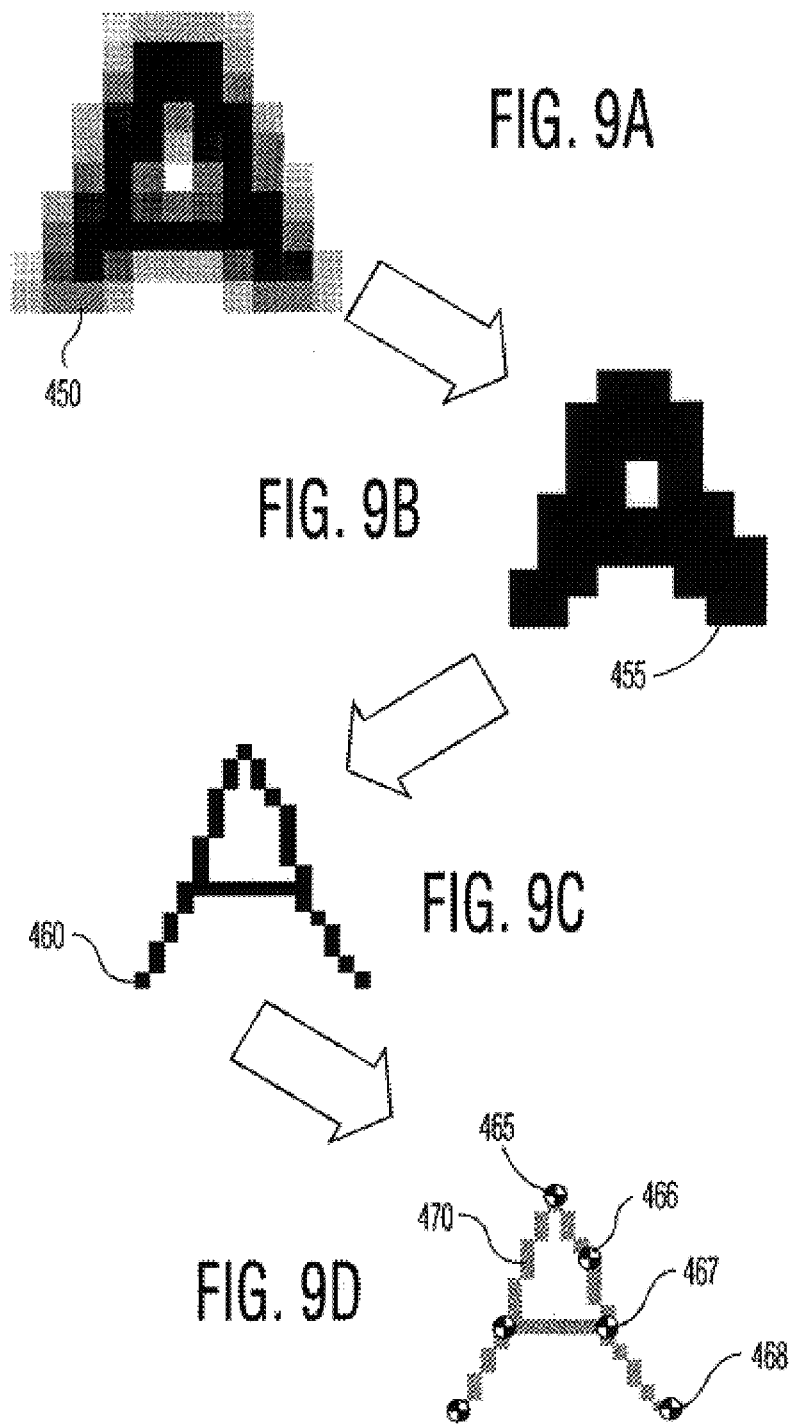

| 4 | 1 | 0 | 2 | ••• | 1 |
|---|---|---|---|---|---|
| 0-5 | 5-10 | 10-15 | 15-20 | | 175-180 |

FIG. 11A

| | 0-5 | 5-10 | 10-15 | 15-20 | ••• | 175-180 |
|---|---|---|---|---|---|---|
| 150-180 | 0 | 0 | 0 | 0 | ••• | 0 |
| 120-150 | 2 | 0 | 0 | 1 | ••• | 1 |
| 90-120 | 0 | 0 | 0 | 0 | ••• | 0 |
| 60-90 | 0 | 0 | 0 | 1 | ••• | 0 |
| 30-60 | 1 | 0 | 0 | 0 | ••• | 0 |
| 0-30 | 1 | 1 | 0 | 0 | ••• | 0 |

FIG. 11B

VIDEO STREAM CLASSIFIABLE SYMBOL ISOLATION METHOD AND SYSTEM

CROSS-REFERENCE TO RELATED APPLICATIONS

The present invention is related to one described in United States Patent Application entitled "SYSTEM AND METHOD FOR ANALYZING VIDEO CONTENT USING DETECTED TEXT IN VIDEO FRAMES," filed Aug. 9, 1999, Ser. No. 09/370,931, which is commonly assigned to the assignee of the present invention and the entirety of which is hereby incorporated by reference as if fully set forth herein. The invention is also related to one disclosed in U.S. Provisional Patent Application No. 60/117,658, filed on Jan. 28, 1999, entitled "METHOD AND APPARATUS FOR DETECTION AND LOCALIZATION-OF TEXT IN VIDEO," which is commonly assigned to the assignee of the present invention. The disclosure of this related provisional patent application is incorporated herein by reference for all purposes as if fully set forth herein. The invention is also related to one disclosed in an application, filed concurrently herewith, entitled "SYMBOL CLASSIFICATION WITH SHAPE FEATURES APPLIED TO NEURAL NETWORK," which is commonly assigned to the assignee of the present invention. The disclosure of this related provisional patent application is incorporated herein by reference for all purposes as if fully set forth herein.

BACKGROUND OF THE INVENTION

The present invention relates to systems that recognize patterns in digitized images and more particularly to such systems that isolate symbols such as text characters in video data streams.

Real-time broadcast, analog tape, and digital video are important for education, entertainment, and a host of multimedia applications. With the size of video collections being in the millions of hours, technology is needed to interpret video data to allow this material to be used and accessed more effectively. Various such enhanced uses have been proposed. For example, the use of text and sound recognition can lead to the creation of a synopsis of an original video and the automatic generation of keys for indexing video content. Another range of applications relies on rapid real-time classification of text and/or other symbols in broadcast (or multicast, etc.) video data streams. For example, text recognition can be used for any suitable purpose, for example video content indexing.

Various text recognition techniques have been used to recognize digitized patterns. The most common example is document optical character recognition (OCR). The general model for all of these techniques is that an input vector is derived from an image, the input vector characterizing the raw pattern. The vector is mapped to one of a fixed number or range of symbol classes to "recognize" the image. For example, the pixel values of a bitmap image may serve as an input vector and the corresponding classification set may be an alphabet, for example, the English alphabet. No particular technique for pattern recognition has achieved universal dominance. Each recognition problem has its own set of application difficulties: the size of the classification set, the size of the input vector, the required speed and accuracy, and other issues. Also, reliability is an area that cries out for improvement in nearly every area of application.

As a result of the foregoing shortcomings, pattern recognition is a field of continuous active research, the various applications receiving varying degrees of attention based on their respective perceived merits, such as utility and practicability. Probably the most mature of these technologies is the application of pattern recognition to text characters, or optical character recognition (OCR). This technology has developed because of the desirability and practicality of converting printed subject matter to computer-readable characters. From a practicality standpoint, printed documents offer a data source that is relatively clear and consistent. Such documents are generally characterized by high-contrast patterns set against a uniform background and are storable with high resolution. For example, printed documents may be scanned at arbitrary resolution to form a binary image of the printed characters. Also, there is a clear need for such an application of pattern recognition in that the conversion of documents to computer-based text avoids the labor of keyboard transcription, realize economy in data storage, permits documents to be searched, etc.

Some application areas have received scant attention because of the attending difficulty of performing symbol or character classification. For example, the recognition of patterns in video streams is an area that is difficult due to at least the following factors. Characters in a video stream tend to be presented against spatially non-uniform (sometimes, temporally variable) backgrounds, with poor resolution, and low contrast. Recognizing characters in a video stream is therefore difficult and no reliable methods are known. In addition, for some applications, as disclosed in the foregoing related applications at least, fast recognition speeds are highly desirable.

Systems and methods for indexing and classifying video have been described in numerous publications, including: M. Abdel-Mottaleb et al., "CONIVAS: Content-based Image and Video Access System," Proceedings of ACM Multimedia, pp. 427–428, Boston (1996); S-F. Chang et al., "VideoQ: An Automated Content Based Video Search System Using Visual Cues," Proceedings of ACM Multimedia, pp. 313–324, Seattle (1994); M. Christel et al., "Informedia Digital Video Library," Comm. of the ACM, Vol. 38, No. 4, pp. 57–58 (1995); N. Dimitrova et al., "Video Content Management in Consumer Devices," IEEE Transactions on Knowledge and Data Engineering (November 1998); U. Gargi et al., Indexing Text Events in Digital Video Databases," International Conference on Pattern Recognition, Brisbane, pp. 916–918 (August 1998); M. K. Mandal et al., "Image Indexing Using Moments and Wavelets," IEEE Transactions on Consumer Electronics, Vol. 42, No. 3 (August 1996); and S. Pfeiffer et al., "Abstracting Digital Moves Automatically," Journal on Visual Communications and Image Representation, Vol. 7, No. 4, pp. 345–353 (1996).

The extraction of characters by a method that uses local thresholding and the detection of image regions containing characters by evaluating gray-level differences between adjacent regions has been described in "Recognizing Characters in Scene Images," Ohya et al., IEEE Transactions on Pattern Analysis and Machine Intelligence, Vol. 16, pp. 214–224 (February 1994). Ohya et al. further discloses the merging of detected regions having close proximity and similar gray levels in order to generate character pattern candidates.

Using the spatial context and high contrast characteristics of video text to merge regions with horizontal and vertical edges in close proximity to one another in order to detect text has been described in "Text, Speech, and Vision for Video Segmentation: The Informedia Project," by A. Hauptmann et al., AAAI Fall 1995 Symposium on Computational Models for Integrating Language and Vision (1995). R.

Lienhart and F. Suber discuss a non-linear color system for reducing the number of colors in a video image in "Automatic Text Recognition for Video Indexing," SPIE Conference on Image and Video Processing (January 1996). The reference describes a split-and-merge process to produce homogeneous segments having similar color. Lienhart and Suber use various heuristic methods to detect characters in homogenous regions, including foreground characters, monochrome or rigid characters, size-restricted characters, and characters having high contrast in comparison to surrounding regions.

The use of multi-valued image decomposition for locating text and separating images into multiple real foreground and background images is described in "Automatic Text Location in Images and Video Frames," by A. K. Jain and B. Yu, Proceedings of IEEE Pattern Recognition, pp. 2055–2076, Vol. 31 (Nov. 12, 1998). J-C. Shim et al. describe using a generalized region-labeling algorithm to find homogeneous regions and to segment and extract text in "Automatic Text Extraction from Video for Content-Based Annotation and Retrieval," Proceedings of the International Conference on Pattern Recognition, pp. 618–620 (1998). Identified foreground images are clustered in order to determine the color and location of text.

Other useful algorithms for image segmentation are described by K. V. Mardia et al. in "A Spatial Thresholding Method for Image Segmentation," IEEE Transactions on Pattern Analysis and Machine Intelligence, Vol. 10, pp. 919–927 (1988), and by A. Perez et al. in "An Iterative Thresholding Method for Image Segmentation," IEEE Transactions on Pattern Analysis and Machine Intelligence, Vol. 9, pp. 742–751 (1987).

Various techniques for locating text in a digitized bitmap are known. Also known are techniques for binarizing character data to form an image that can be characterized as black-on-white and for performing character recognition on bitmap images. Text, and other patterns, in video streams range from the predictable, large, and clear, which are easy to classify to the crude, fleeting, and unpredictably-oriented and—positioned, which contain insufficient information, even in principle, to classify without assistance from auxiliary contextual data. There is also on-going research to increase recognition speed as well as accuracy. Therefore, there is room for improvement in the current state of the art, particularly where the application, such as video stream data, strains current technology.

SUMMARY OF THE INVENTION

Briefly, an image processing device and method for classifying symbols relies on a connected-component technique for isolating symbol regions. The device and method form connected components from an image derived by the application of an edge detection filter. The formation of connected components from this filtered image defines the edges of character shapes. The connected components are filtered based on threshold criteria such as area, height, width, aspect ratio, etc. As a result, the number of pixels that must be connected to define each connected component is substantially reduced and the speed of processing thereby increased. The application of the method is discussed primarily with respect to text in a video stream.

A character classifier for text in video streams employs a back propagation neural network (BPNN) whose feature space is derived from size, translation, and rotation invariant shape-dependent features. Such feature spaces are made practicable by the accurate isolation of character regions using the above technique. Examples of such feature spaces include regular and invariant moments and an angle histogram derived from a Delaunay triangulation of the thinned, thresholded, character. Such feature spaces provide a good match to BPNN as a classifier because of the poor resolution of characters in video streams.

The ability to detect and classify text appearing in video streams has many uses. For example, video sequences and portions thereof, can be characterized and indexed according to classifications derived from such text. This can lead to indexing, enhanced search capabilities, annotation features, etc. In addition, recognition of text in a video stream can permit the presentation of context-sensitive features such as an invokable link to a web site generated in response to the appearance of a web address in a broadcast video stream.

Text in video presents a very different problem set from that of document OCR, which is a well-developed, but still maturing technology. Text in documents tends to be uni-colored and high quality. In video, scaled-down scene images may contain noise and uncontrolled illumination. Characters appearing in video can be of varying color, sizes, fonts, orientation, thickness, backgrounds can be complex and temporally variant, etc. Also, many applications for video symbol recognition require high speed.

The technique employed by the invention for classifying video text employs an accurate high speed technique for symbol isolation. The symbol bitmap is then used to generate a shape-dependent feature vector, which is applied to a BPNN. The feature vector provides greater emphasis on overall image shape while being relatively insensitive to the variability problems identified above. In the technique for isolating character regions, connected component structures are defined based on the edges detected. Since edge detection produces far fewer pixels overall than binarizing the entire field occupied by a symbol, the process of generating connected components can be much more rapid. The selection of feature space also enhances recognition speed. With simulated BPNNs the size of the input vector can seriously affect throughput. It is very important to be selective with regard to the components used from the selected feature space. Of course, heterogeneous feature spaces may be formed by combining mixes of different features such as moments and line-segment features. Also, computational economies may be realized where the selected features share computational steps.

The invention will be described in connection with certain preferred embodiments, with reference to the following illustrative figures so that it may be more fully understood. With reference to the figures, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

BRIEF DESCRIPTION OF THE DRAWINGS

FIGS. 6A–6D illustrate a technique for text line segmentation according to an embodiment of the invention.

FIGS. 9A–9D illustrate the filtering of a segmented character to derive a feature vector precursor.

FIGS. 11A and 11B illustrate an angle histogram-type feature space according to an embodiment of the invention.

DETAILED DESCRIPTION OF THE PREFERRED EMBODIMENTS

Figure 1:
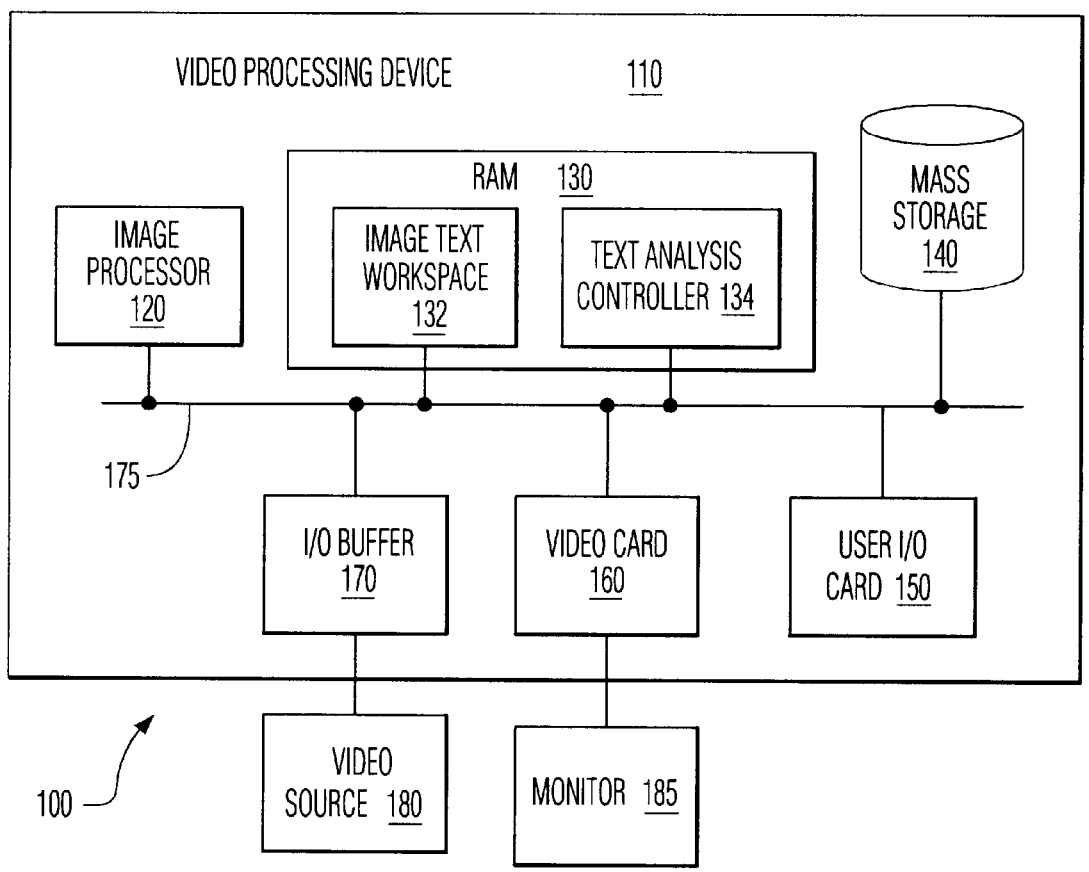
FIG. 1 is diagram illustrating machinery that may be used to implement the invention.

Referring to FIG. 1, an image text analysis system 100 employs a video processing device 110, video source 180, and possibly, monitor 185 to receive video input and generate and store character information embedded in it. Video processing device 110 receives video images, parses frames, isolates text areas and character regions, and classifies the text and/or character regions according to procedures discussed in detail below. Video is supplied from the video source 180. Video source 180 can be any source of video data including a VCR with a analog-digital converter (ADC), a disk with digitized video, a cable box with an ADC, a DVD or CD-ROM drive, digital video home system (DVHS), digital video recorder (DVR), hard disk drive (HDD), etc. Video source 180 may be capable of providing a few short clips or multiple clips, including longer length digitized video images. Video source 180 may provide video data in any analog or digital format, such as MPEG-2, MJPEG.

Video processing device 110 may include image processor 120, RAM 130, storage 140, user I/O card 150, video card 160, I/O buffer 170, and processor bus 175. Processor bus 175 transfers data between the various elements of video processing device 110. RAM 130 further comprises image text work space 132 and text analysis controller 134. Image processor 120 provides over-all control for video processing device 110 and performs the image processing required for image text analysis system 100, including analyzing text in video frames based upon system-selected and user-selected attributes. This also includes implementing editing processes, processing digitized video images for display on monitor 185 and/or storage in storage 140, and transferring data between the various elements of image text analysis system 100. The requirements and capabilities for image processor 120 are well known in the art and need not be described in greater detail, other than as required for the present invention.

RAM 130 provides random access memory for temporary storage of data produced by video processing device 110, which is not otherwise provided by components within the system. RAM 130 includes memory for image text work space 132 and text analysis controller 134, as well as other memory required by image processor 120 and associated devices. Image text work space 132 represents the portion of RAM 130 in which video images associated with a particular video clip are temporarily stored during the text analysis process. Image text work space 132 allows copies of frames to be modified without affecting the original data, so that the original data may later be recovered.

In one embodiment of the present invention, text analysis controller 134 represents the portion of RAM 130 dedicated to storage of an application program executed by image processor 120 that performs the analysis of video images on the basis of system- or user-defined text attributes. Text analysis controller 134 may execute well-known editing techniques, such as morphing or boundary detection between scenes, as well as the novel techniques for video text recognition associated with the present invention. Text Analysis controller 134 may also be embodied as a program on a CD-ROM, computer diskette, or other storage media that may be loaded into a removable disk port in storage 140 or elsewhere, such as in video source 180.

Storage 140 comprises one or more disk systems, including removable disks (magnetic or optical), for permanent storage of programs and other data, including required video and audio data. Depending upon system requirements, storage 140 may be configured to interface with one or more bi-directional buses for the transfer of video and audio data to and from video source(s) 180, as well as the rest of the system. Storage 140 is capable of transferring data at video rates, as required. Storage 140 is sized to provide adequate storage for several minutes of video for editing purposes, including text attribute analysis. Depending upon specific applications and the capability of image processor 120, storage 140 may be configured to provide capability for storage of a large number of video clips.

User I/O card 150 may interface various user device(s) (not shown) to the rest of image text analysis system 100. User I/O card 150 converts data received from the user devices to the format of interface bus 175 for transfer to image processor 120 or to RAM 130 for subsequent access by image processor 120. User I/O card 150 also transfers data to user output devices such as printers (not shown). Video card 160 provides an interface between monitor 185 and the rest of video processing device 110 through data bus 175.

I/O buffer 170 interfaces between video source 180 and the rest of image text analysis system 100 through bus 175. As previously discussed, video source 180 has at least one bi-directional bus to interface with I/O buffer 170. I/O buffer 170 transfers data to/from video source 180 at the required video image transfer rate. Within video processing device 110, I/O buffer 170 transfers data received from video source 180 to storage 140, to image processor 120, or to RAM 130, as required. Simultaneous transfer of video data to image processor 120 provides means for displaying video image as they are received.

Figure 2:
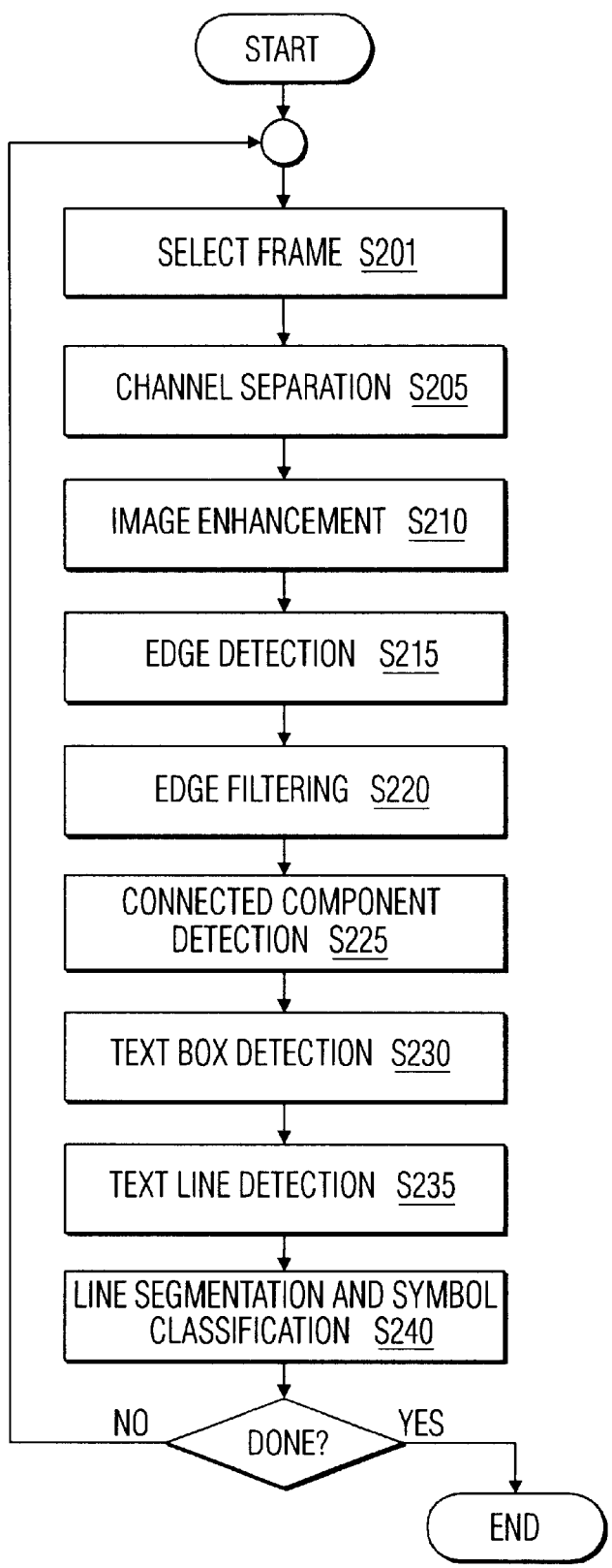
FIG. 2 is a flowchart showing a character classification method according to an embodiment of the invention.
Figure 3A:
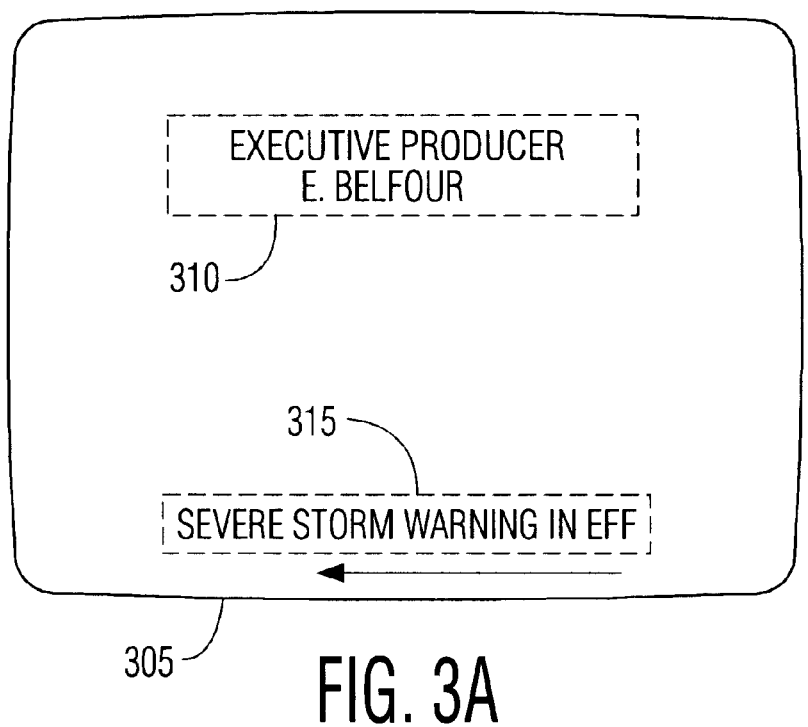
FIGS. 3A and 3B illustrate text regions in a video screen that contain information classifiable according to an embodiment of the invention.
Figure 3B:
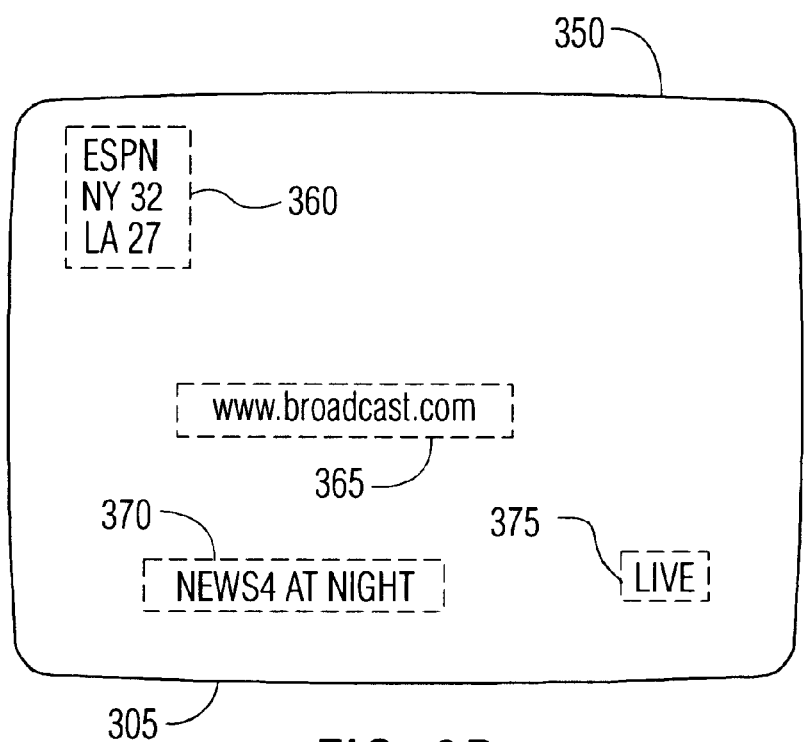

Referring now to FIGS. 2, 3A, and 3B, a text extraction and recognition operation (as outlined in FIG. 2) 100 can be performed by the video processing device 110 or any other suitable device on a video sequence containing text, such as illustrated in FIGS. 3A and 3B. Individual frames 305 are subjected to the procedure outlined in FIG. 2 to result in an isolation of individual text regions such as 310, 315, 360, 365, 370, and 375. Note that the procedure can be applied to an integral of multiple frames integrated to reduce the complexity of the background and increase the clarity of the text. That is, where a number of subsequent frames contain the same text regions (and this can be identified where the text regions contain substantially the same signal characteristics such as a similar spectral density function), multiple successive frames can be integrated (e.g., averaged). This tends to make the text regions clearer and cause the text to be better set off against the background. Where a background is a moving image, the complexity of the background is necessarily reduced by this procedure. Note that some of the benefits of such signal-averaging may also be obtained from the source where time integration is done for moving picture enhancement, as in modern televisions. Thus, for the following discussion, the notion of operating on a "single" frame is by no means restricted to a single "frame grab" and the "frame" upon which image analysis is done could be a composite of one or more successive video frames.

Figure 4A:
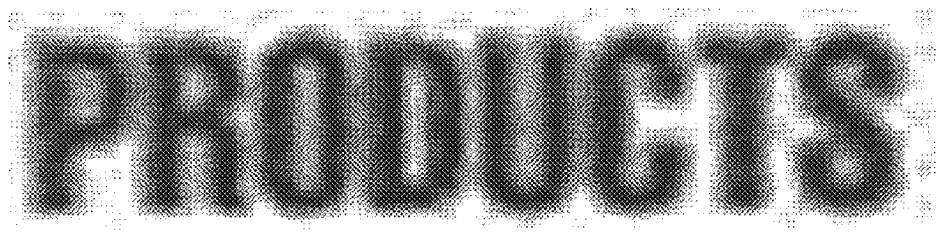
FIG. 4A shows the appearance of a text segment from a captured digital image of a video frame.

Initially, image processor 120 may separate colors of one or more frames of the video image and store a reduced color image for use in extracting text. In one embodiment of the present invention, image processor 120 uses a red-green-blue (RGB) color space model to isolate the red component of the pixels. An example of how a text portion of a frame might look is shown in FIG. 4A. The red component is often the most useful for detecting white, yellow, and black colors, which are predominantly used for video text. That is, for overlaid (superimposed) text, the isolated red frame provides sharp, high-contrast edges for the common text colors. The current method may also be used to extract text that is not overlaid on the video but is actually part of it such as a film sequence that dwells on a billboard or street sign. In such a case, the red frame may not be the best to use. In such cases, a gray scale (alpha channel) may provide the best starting point. Note that in alternate embodiments of the present invention, image processor 120 may use various color space models, such as the gray scale image or the Y component of a YIQ video frame, etc.

The isolated frame image is stored in image text work space 132. Then, in step S210, before further processing is performed, the captured image may be sharpened. For example, the following 3×3 mask could be used:

$$\begin{matrix} -1 & -1 & -1 \\ -1 & 8 & -1 \\ -1 & -1 & -1 \end{matrix}$$

in which each pixel is the sum of eight times itself plus the negative of each of its neighbors. The above matrix representation for bitmap filters (or "masks") is a common notation in the art. There are many such derivative filters that are known in the art and invention contemplates the use of any of a variety of different techniques for isolating text regions. The above is merely a very simple example. The filtering step can include multiple passes, for example gradient detection along one dimension followed by gradient detection along the other dimension (while simultaneously smoothing in the respective orthogonal directions) followed by addition of the two filtering results. In step S210, random noise may be reduced using, for example, a median filter as described by R. C. Gonzalez and R. E. Woods in "Digital Image Processing," Addison-Wesley Publishing Company, Inc. (1992).

Edge detection may employ another edge filter. Through this filter, the edges in the sharpened (red, gray-scale, etc.) image may be (and preferably are) amplified and non-edges, attenuated, using, for example, the following edge $$\begin{matrix} -1 & -1 & -1 \\ -1 & 12 & -1 \\ -1 & -1 & -1 \end{matrix}$$

where, again, each pixel is the sum of the above respective coefficients (weights) applied to itself and the neighboring pixels. In FIG. 4C, the results of the previous filtering steps is illustrated. The original image 163 is edge-filtered to result in a differential image 164, which is then edge-enhanced to result in a final image 165 that is subjected to the following filtering.

In step S215, a threshold edge filter, or "edge detector" is applied. If $Edge_{m,n}$ represents the m,n pixel of an M×N edge image and $F_{m,n}$ the enhanced image resulting from step S210, the following equation may be used for edge detection:

$$Edge_{m,n} = \sum_{i=-1}^{1} \sum_{j=-1}^{1} w_{i,j} F_{m+i,n+j} < L_{edge} \qquad \text{Equation 1}$$

where 0<m<M and 0<n<N, and $L_{edge}$ is a threshold value which may or may not be constant. The values $w_{ij}$ are weights from the edge mask. The outermost pixels may be ignored in the edge detection process. Note, again, that the sharpening filter may also be applied implicitly in this thresholding operation.

The edge threshold $L_{edge}$ is a pre-determined threshold value, which may be a fixed-value or a variable value. The use of a fixed threshold may result in excessive salt and pepper noise and cause discontinuities in the fixed edges around the text. Known methods of opening (e.g., erosion followed by dilation) result in loss of parts of text. An adaptive threshold edge filter, one with a variable threshold, ameliorates these tendencies and is a great improvement over the use of a static threshold.

In step S220, in one mode of adjusting the edge detection threshold, after a first fixed threshold is applied using the edge detector, the local threshold for any pixels neighboring (within a specified tolerance) edge pixels identified in the fixed threshold step is lowered, and the filter reapplied. In another mode, the latter effect may as easily be accomplished by applying to the result of the threshold step, a smoothing function (assuming the result is stored with a pixel depth greater than two), and then thresholding again. This would cause pixels, marked as non-edges, to become marked as edges. The degree of threshold-lowering for a pixel preferably depends on the number of neighboring pixels marked as edges. The rationale behind this is that when neighboring pixels are edges, it is more likely that the current pixel is an edge. The edge pixels resulting from the lowering of their local threshold is not used for calculating the reduced threshold for neighboring pixels.

Alternatively, a fixed threshold value may be used with a low-pass weighting function to insure that single or small numbers of non-edge pixels surrounded by strong edge pixels (pixels that have a high gradient) are marked as edge pixels. In fact, all the steps S210–S220 described above can be described by a single numerical operation in the form of Equation 1, but with wider ranges on the summations. Their separation into distinct steps should not be considered necessary or limiting and may depend on particulars of the computational equipment and software as well as other considerations.

Once the character edges are detected, image processor 120 performs preliminary edge filtering to remove image regions that do not contain text or in which text cannot reliably be detected. For example, frames with an extreme paucity of edges, a very low edge density (number of edge pixels per unit area), or low degree of aggregation of edge pixels (that is, they do not form long-range structures, e.g., noise) may be excluded from further processing.

Image processor 120 may perform edge filtering at different levels. For instance, edge filtering may be performed at a frame level or a sub-frame level. At the frame level, image processor 120 may ignore a frame if more than a reasonable fraction of the frame appears to be composed of edges. Alternatively, filter-functions such as spectral analysis can be applied to determine if the frame is likely to have too many edges. This could result from a high density of strong-edge objects in the frame. The assumption is that overly complex frames contain a high proportion of non-character detail and that it would be disproportionately burdensome to filter it through character classification.

When frame-level filtering is used, image processor 120 maintains an edge counter to determine the number of edge pixels in the image frame. This, however, can lead to the skipping and ignoring of frames that contain intelligible text, such as frames with noisy portions as well as portions with intelligible text. To avoid the exclusion of such image frames or subframes, image processor 120 may perform edge filtering at a sub-frame level. To do this, image processor 120 may divide the frame into smaller areas. To accomplish this, image processor 120 may, for example, divide the frame into three groups of pixel columns and three groups of pixel rows.

Next, image processor 120 determines the number of edges in each sub-frame and sets its associated counter accordingly. If a subframe has more than a predetermined number of edges, the processor may abandon that subframe. The predetermined maximum edge count per region may be set according to the amount of time required to process the image region or the probability that their size relative to the pixel density would render the accuracy of recognition below a desired minimum. A greater number of sub-frames may be utilized to insure against missing smaller regions of clean text surrounded by regions identified as uninterpretable.

Next, in step S225, image processor 120 performs a connected component (CC) analysis on edges generated in the previous step. This analysis groups all edge pixels that are contiguous within a specified tolerance. That is, every edge pixel that is adjacent, or within a certain distance of another edge pixel, is merged together with that pixel. Ultimately, this merging process defines structures, or connected components each having a contiguous or near-contiguous set of edge pixels. The motivation for this is that each text character region is assumed to correspond to a single CC. The tolerance may be set to any suitable value depending on the resolution of the image capture, the degree of upsampling (the proportion of pixels added by interpolation from the original image) or downsampling (the proportion of pixels removed from the original image).

Figure 4B:
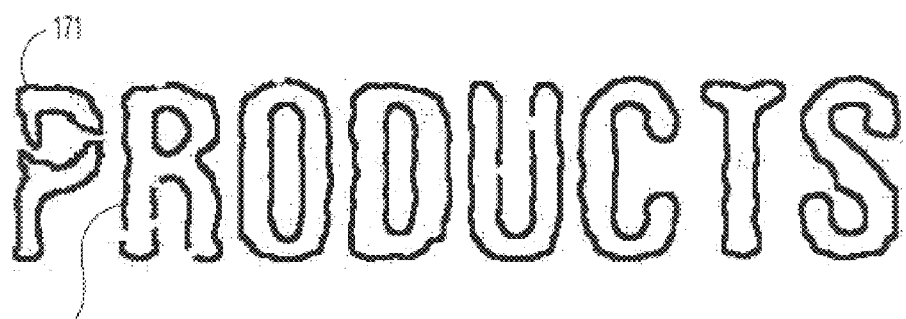
FIG. 4B shows the text segment after edge detection filtering.
Figure 4C:
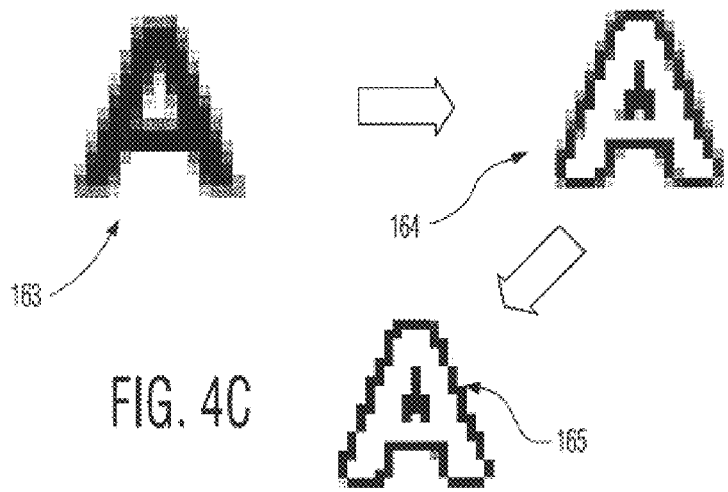
FIG. 4C illustrates the effect of several stages of filtering within or prior to edge detection, noting that these may not actually show intermediate results but are shown for purposes of illustrating concepts associated with the invention.
Figure 5A:
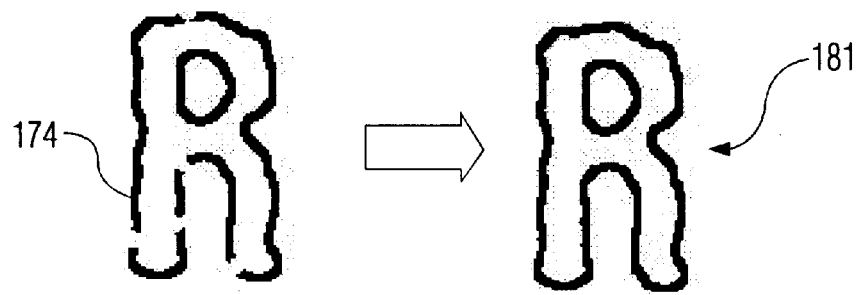
FIGS. 5A and 5B illustrate the effect of edge filtering according to an embodiment of the invention.
Figure 5B:
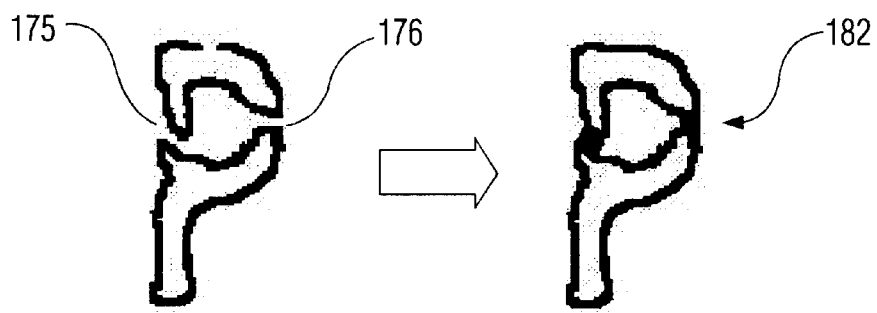
Figure 5C:
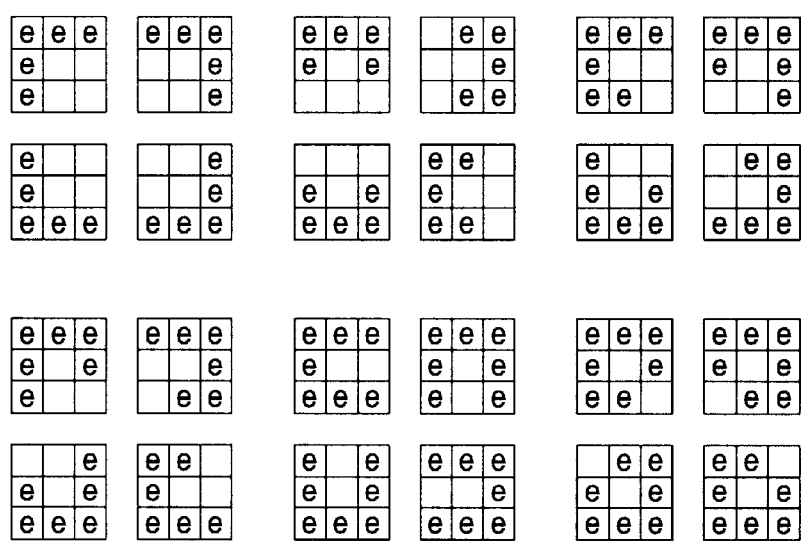
FIG. 5C illustrates an example of a gap-closing algorithm that can be used in the invention.

Referring now to FIG. 4B, inadvertent gaps or breaks between CCs corresponding to contiguous characters may appear as a result of edge detection with a fixed threshold. For example, breaks such as shown at 171 or 172, can occur. The use of the edge-detection scheme described helps to insure the merging of such broken CC portions. Beginning with breaks as in the left hand characters of FIGS. 5A and 5B, the CC merging method results in the points in the breaks 174, 175, and 176 being identified as edge points and being merged into the single connected component structures at 181 and 182, respectively. Note that the closing of "bad" breaks in connected regions can be accomplished by various mechanisms in addition to the particular method described above. For example, dilation could be applied, after erosion or thinning. To avoid the effect of increasing the total area of the edge pixels, the dilation could be followed by thinning before detecting the connected components. Also, the gray scale depth of the binarized thresholded image resulting from the application of Equation 1 could be increased and then a smoothing function could be applied and thresholding (Equation 1) performed again. There are many image processing techniques that could be used to accomplish the desired closing effect. Still another alternative is to mark pixels as edges when they are substantially surrounded by edge pixels in a contiguous series such as illustrated in FIG. 5C. That is, each of the 24 cases illustrated is a pixel with its neighborhood of eight pixels. In each of these cases, the neighborhood has 5 or more edge pixels in a contiguous series. Of course, the number in the contiguous series could be changed or special cases added to the group as well. In addition, the size of the matrices could be increased. The type of pixels favored to be marked as edges by an algorithm such as defined with respect to FIG. 5C are those where a pixel is deemed less likely to be part of a continuous break. A similar result may be obtained by closing (dilation followed by erosion) or by using less sharpening in the mask or preprocessing with respect to the thresholding (application of Equation 1).

The CC is a set of pixels determined to form a contiguous series with no non-edge pixels dividing one portion from another. A list is made of each CC, which contains the coordinate of the leftmost, rightmost, topmost, and bottommost pixels in the structure, along with an indication of the location of the structure, for example, the coordinates of the center of the structure. Also stored can be the number of pixels that form the connected component structure. Note that the pixel count represents the area of the particular connected component structure. Predetermined system and/ or user thresholds may be used to define the maximum and minimum limits for area, height and width of the connected component structure to determine which connected component structures to pass on to the next processing stage. The last step is a filter to determine if a CC may qualify as a character or not. Other heuristics can be used to assemble CCs too small to meet CC heuristics by themselves or to split ones that are too large.

In step S230, image processor 120 sorts the connected components satisfying the criteria in the previous steps in ascending order based on the location of the bottom left pixel. Image processor 120 sorts on the basis of the pixel coordinate. The sorted list of Connected components is traversed to determine which CCs form blocks ("boxes") of text.

Image processor 120 assigns the first CC to the first box and also as the initial or current box for analysis. Image processor 120 tests each subsequent CC to see if its bottommost pixel lies on the same horizontal line (or a nearby one) as the corresponding pixel of the first CC. That is, it is added to the current text box if its vertical location is close to that of the current CC. If it does, it is assumed to belong to the same line of text. The vertical coordinate difference threshold may be fixed or variable. Preferably, the closeness of the horizontal coordinate of the second CC is a function of the height of the CCs. The horizontal distance of the candidate new addition to the current text box is also tested to see if it lies within an acceptable range.

If a CC does not meet the criteria for merging with the current text box, a new text box is generated with the failing CC marked as its first element. This process may result in multiple text boxes for a single line of text in the image. When the next connected component in a series has a substantially different vertical-coordinate or a horizontal coordinate that is lower than that of the last CC the current text box may be closed at the end of the horizontal traverse and a new one started.

For each box, image processor 120 then performs a second level of merging for each of the text boxes created by the initial character merging process. This merges text boxes that might have been erroneously interpreted as separate lines of text and therefore placed in separate boxes. This could result from strict connected component merging criteria or due to poor edge detection, thereby resulting in multiple CCs for the same character.

Image processor 120 compares each box to the text boxes following it for a set of conditions. The multiple test conditions for two text boxes are:

a) The bottom of one box is within a specified vertical-spacing of the other, the spacing corresponding to an expected line spacing. Also, the horizontal spacing between the two boxes is less than a variable threshold based on the average width of characters in the first box.

b) The center of either of the boxes lies within the area of the other text box, or c) The top of the first box overlaps with the bottom of the second text box and the left or right side of one box is within a few pixels of the left or right side of the other, respectively.

If any of the above conditions is satisfied, image processor 120 deletes the second box from the list of text boxes and merges it into the first box. Image processor 120 repeats the process until all text boxes are tested relative to each other and combined as far as possible.

In step S235, image processor 120 accepts the text boxes obtained from step 235 as text lines if they conform to specified constraints of area, width and height. For each of the text boxes, image processor 120 extracts the sub-image corresponding to the text box from the original image. Image processor 120 then binarizes the subimage in preparation for character recognition. That is, the color depth is decreased to 2, with thresholding set to a value that insures the characters are properly set off from the background. This is a difficult problem and it may involved a number of steps, such as integrating multiple frames to simplify a complex background.

The threshold for binarizing the image can be determined as follows. Image processor 120 modifies the text box image by calculating the average grayscale value of the pixels in the text box (AvgFG). This is used as the threshold for binarizing the image. Also calculated is the average grayscale value of a region (for example, 5 pixels) around the text box (AvgBG). The subimage is binarized by marking anything above AvgFG as white and anything below AvgFG as black. The average for the pixels marked as white, Avg1, is calculated along with the average for the pixels marked as black, Avg2.

Once the text box is converted to a black and white (binary) image, image processor 120 compares Avg1 and Avg2 to AvgBG. The region that has an average closer to AvgBG is assigned as the background and the other region is assigned as the foreground (or text). For example, if the black region average is closer to AvgBG, the black region is converted to white and vice versa. This assures that the text is always a consistent value for input to an OCR program. Image processor 120 subsequently stores the extracted frame text in image text work space 132 and the process continues with the next frame at process step 205. Note that, prior to local thresholding, a super-resolution step can be performed to enhance the text resolution.

Next, individual character regions must be isolated before classification can be done. To isolate the individual character regions from lines of text, various heuristics may be used, for example, ratios of character height to width, ceilings and thresholds for height and width, etc. These heuristics generally fall into the category of predictions of permissible values for various dimensional features.

Connected components may fail to correspond to a character because of a lack of clarity in the original text. Referring now to FIGS. 6A–6D, if the CC partitioning fails, another tool may be used for partitioning the characters along a horizontal line. One example is a vertical projection 425 that is a function of the horizontal coordinate and whose value is proportional to the number (and possibly also, the gray-scale value, as illustrated) of foreground pixels in a vertical column coinciding with the x-coordinate and contained within the current text box. That is, the vertical column over which the pixels are integrated does not exceed the size of the text box so only the current row of characters is measured this way. This "Gray-scale" vertical projection 425 may also be weighted by a window function 425 whose width is proportional to an expected width for the next character in a sequence. The result of weighting by the window function 425 is illustrated at 420. The minimum projection values may be used to define the left and right edges of the character.

Figure 7A:
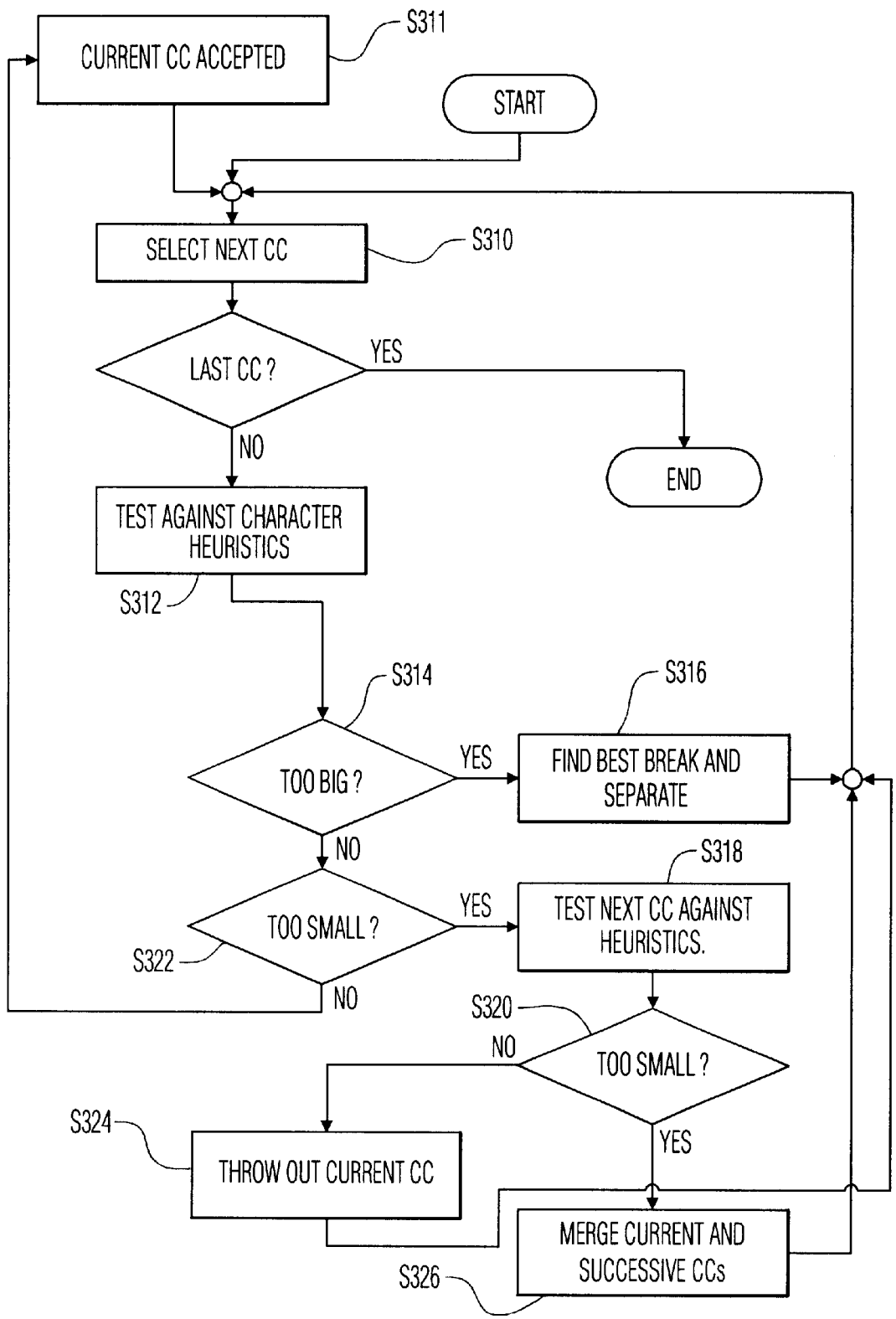
FIGS. 7A and 7B are flow diagrams illustrating a technique for the creation and management of connected components according to a filtering process of an embodiment of the invention.

Referring to FIG. 7A, a method for isolating the character regions, starts with a first CC and proceeds sequentially through a text box. Beginning at step S310 a first, or next, CC is selected. At step S312 the selected CC is tested against dimensional heuristics to see if the CC meets them. The heuristic tests on the CC may indicate that the CC is unlikely to be a full character or that it is too large and likely includes more than one character. If the CC is found to be too big in step S314, an alternative method of partitioning the characters is applied in step S316, for example, the Gray-scale projection described above. If the CC is found to be too small in step S322, the next CC is tested against the heuristics in step S318. If this shows, in step S320, that the following CC is too small also, the then the current and following CCs are merged in step S326 and flow proceeds back to step S310 until all the character regions have been isolated. If the following CC is not too small, the current CC is discarded in step S324 and flow proceeds to step S310.

Figure 7B:
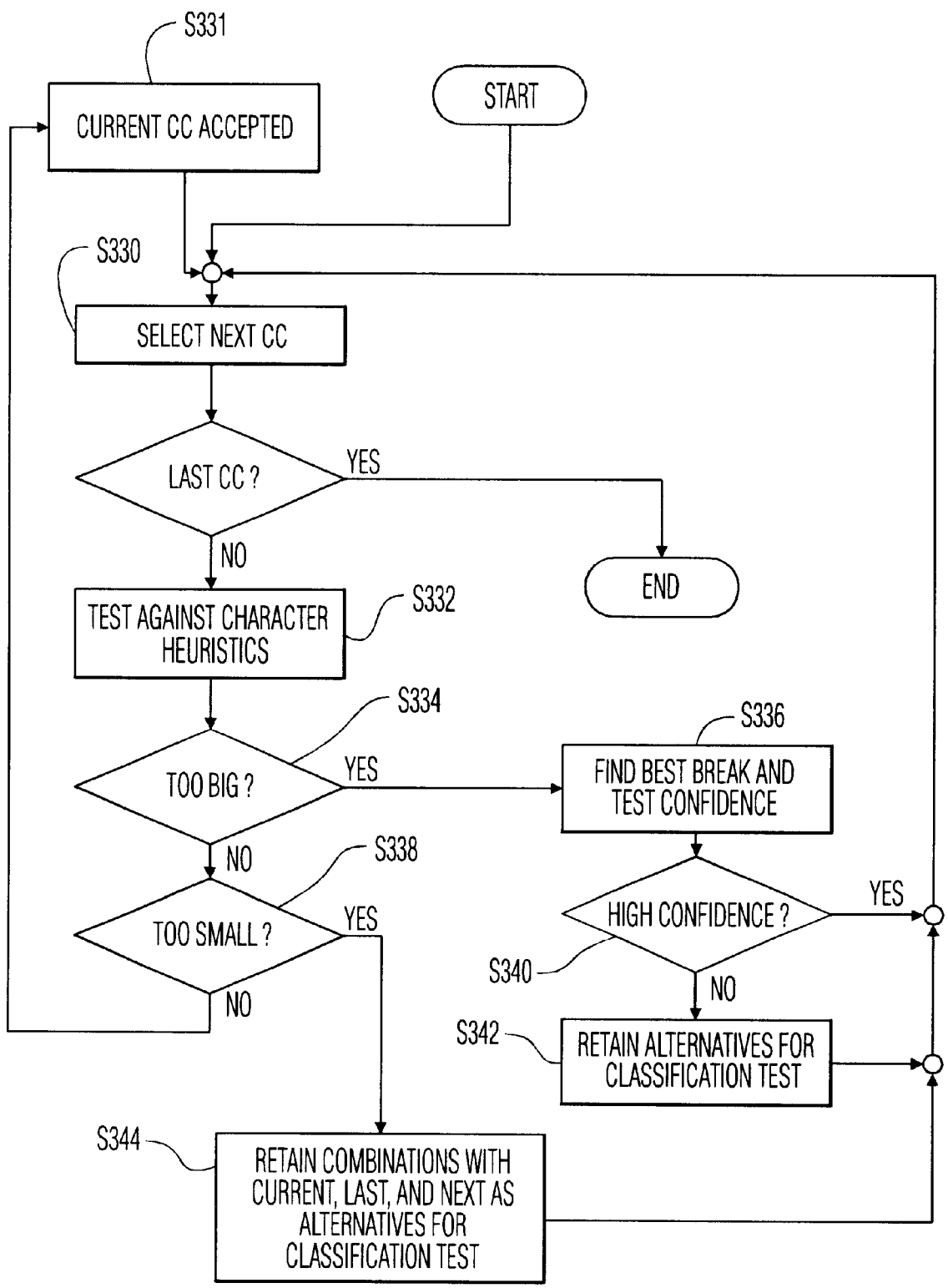

Referring to FIG. 7B, another way of partitioning the characters saves alternative character regions that fail the heuristics and attempts to classify the alternatives. Upon classification, the alternative that achieves the highest confidence level is chosen. Other character regions are then treated accordingly. For example if the image corresponding to two merged CCs is classified with a high confidence measure, the field corresponding to the CC with which the first CC was merged is no longer treated as a separate character field. In step S330, a first, or next, CC is selected.

At step S332 the selected CC is tested against dimensional heuristics to see if the CC meets them. If the CC is found to be too big in step S334, an alternative method of partitioning the characters is applied in step S336. If the CC is found to be too small in step S338, the current CC, and the current CC combined with the next CC, are both retained as alternative character fields. When the character fields are submitted for classification as described below, a confidence measure is used to choose between the alternatives. Then flow proceeds back to step S310 until all the character regions have been isolated. If the break operation of step S336 produces a low-confidence measure, then the oversized and fractured fields are retained as alternatives for use in classification and the classification results used to choose between the alternatives.

Note that the regions coinciding with characters need not be defined to be rectilinear boxes. They could be rubber-band type bounding regions (a convex polygon with an arbitrary number of sides) or an orthogonally convex rectilinear polygon (A rectilinear polygon in which every horizontal or vertical segment connecting two points inside also lies totally inside) or any other suitable shape substantially enclosing the interesting features of the expected symbols or characters.

Note also that the text box formation can be omitted entirely and the connected components used directly to identify candidate character regions. In such a case, however, it is expected that greater numbers of connected components will be outside of the particular symbol set into which they are to be mapped (classified). Note also that it is clear from the foregoing description that the above technique can be applied to symbol classification generally and is not limited to textual character classification.

Figure 8:
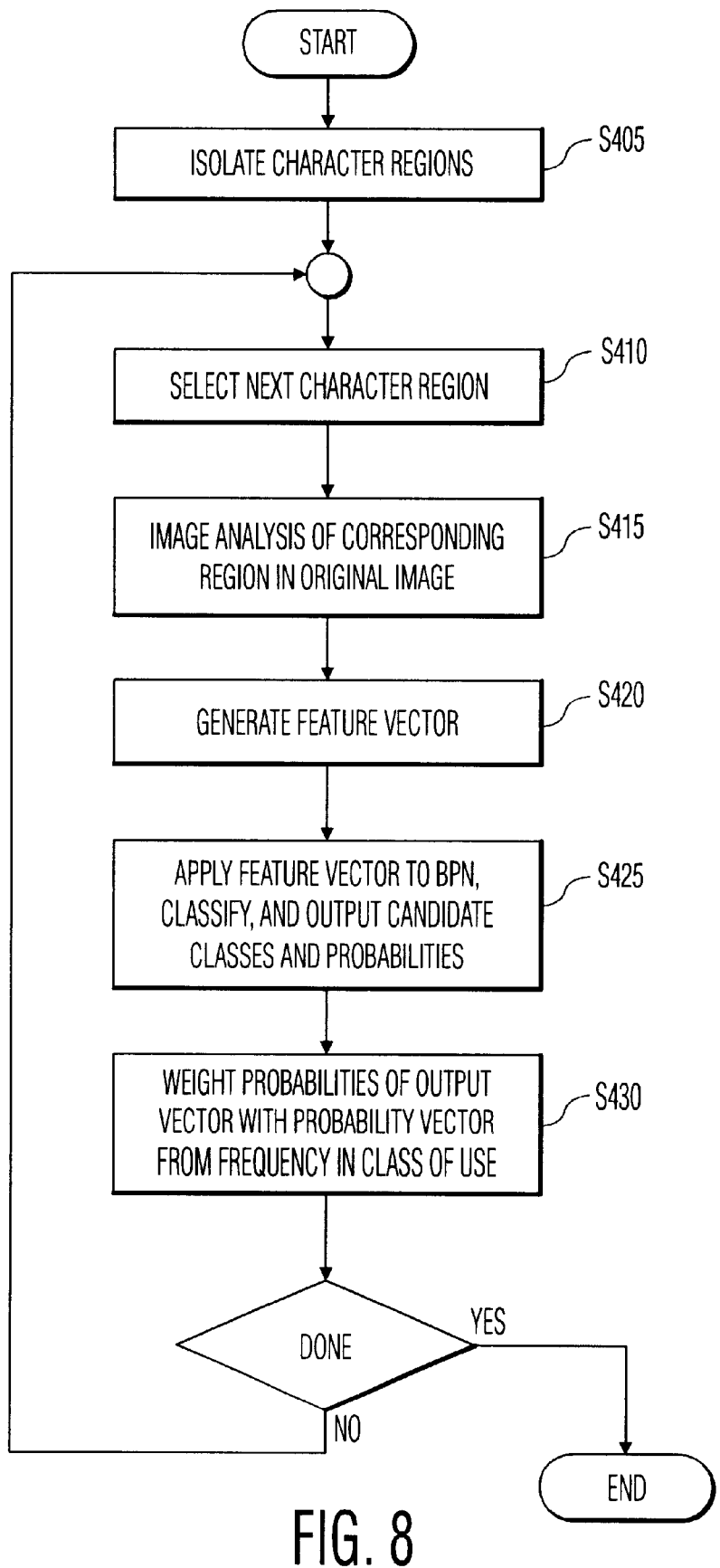
FIG. 8 is a flowchart illustrating a character classification method according to an embodiment of the invention.

Referring to FIG. 8, once all the character regions have been isolated (subsumed by step S405), the characters can be classified in sequence. Next, in step S410, a first or sequential character region is selected. In step S415, the part of the original image (or the red portion thereof) is then subjected to some appropriate image analysis to prepare for feature analysis. For example, the image may be binarized (thresholded), gray-scaled image, binarized and thinned, etc. The pretreatment varies based on the feature space used.

Referring also to FIGS. 9A–9D, for example, a feature space may make use of certain feature points, (as described below). The feature points are identifiable with skeleton characters and to derive these from the regular video characters (FIG. 9A), the image may be binarized (FIG. 9B) and then thinned (FIG. 9C). Then the feature points (FIG. 9D, 465–468) may be derived as the corner points 465, bends 466, crossing points 467, and end points 468 of the thinned character 460, 470. This sort of image processing is well-suited to the angle-histogram feature space described below. A lower degree of image processing would be needed for calculating size-invariant moments. Note that other feature point definition systems may be used as well.

Referring again to FIG. 8, the original character may be subjected to various different analyses to define a feature vector that may be applied to the inputs of a suitably-trained back propagation neural network (BPNN). For the techniques that employ size-invariant moments, the unthinned or thinned characters may be used. In step S420, the chosen feature vector is generated by the appropriate image analysis. A variety of these can be used. A number of different feature spaces have been defined for the application that concerns the instant patent. The defined feature spaces, which are described in detail below, are size and rotation invariant and considered particularly suitable to video character classification using a BPNN classifier.

Figure 10A:
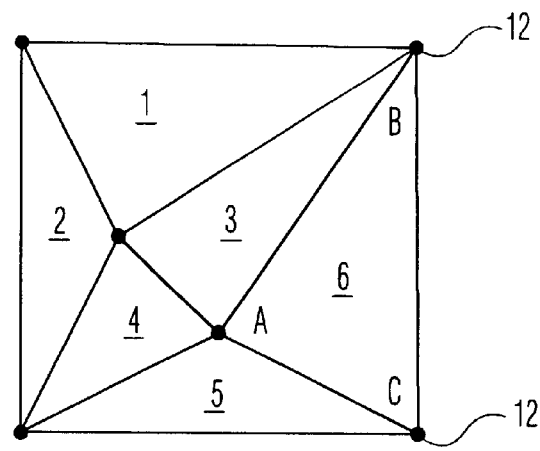
FIGS. 10A and 10B illustrate Delaunay triangulation and Voronoy diagram stages in an image filtering step in a character classification process according to an embodiment of the invention.
Figure 10B:
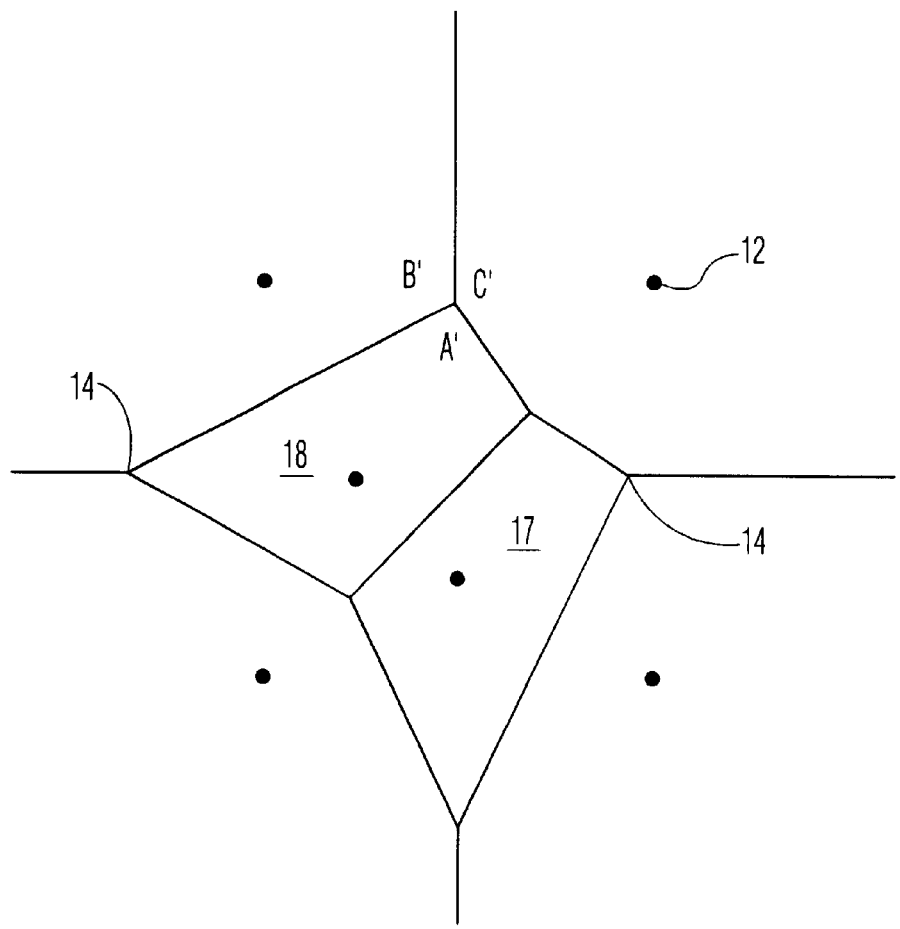

A first feature space is derived from the feature points of the thinned character as illustrated by FIGS. 9A–9D. Referring to FIGS. 10A and 10B, first, a Delaunay triangulation (FIG. 10A) or a Voronoy diagram (FIGL. 10B) is derived from the feature points 12. The image processor 120 performs the triangulation and then, for each triangle 1–6, generates an inventory of the internal angles. It then uses this inventory to generate a histogram of the angles, as shown illustrated in FIG. 11A. The histogram simply represents the frequency of angles A, B, and C of a given size range in the set of triangles 1–6 defined by the triangulation. Note that other triangulation methods or polygon-generating methods can be used. For example, referring to FIG. 10B, a set of Voronoy polygons 17 and 18 can be used to define a set of angles A', B', and C', each associated with a vertex 14 of the Voronoy diagram. The angle histogram that results serves as the feature vector for the particular character from which the features points were derived.

Other size and rotation invariant features may be added to the above feature space, for example, the number of horizontal lines, the number of crossing points, the number of endpoints, holes, inflection points, midpoints etc. Another variation on the angle histogram is the use of only the two largest (or smallest) of the interior angles of each triangle. Still another variation of the angle histogram is to use a two dimensional angle histogram instead of the one-dimensional angle histogram. For example, referring to FIG. 11B, the largest (or smallest) pair of angles for each triangle defines an ordered pair (ordered by size) for each triangle in the Delaunay triangulation (or each vertex of the Voronoy diagram). The first element of each ordered pair is used for the first dimension of the matrix and the second element, for the second dimension of the matrix. In this way, the association between angles is preserved as information for training and classifying using the BPNN classifier.

Still another feature spaced considered particularly suitable for the video character BPNN classifier is an array of size-invariant moments. These moments are defined by the following equations. Although there is a large number of separate moments that could be used in the circumstance, a particular few are selected for this application. First, the pixel indices of the pixel location coinciding with the center of mass, $\bar{i}, \bar{y}$, is given by $$\bar{i} = \frac{\sum_{i=1}^{n}\sum_{j=1}^{m} iB[i][j]}{A}$$

$$\bar{j} = \frac{\sum_{i=1}^{n}\sum_{j=1}^{m} jB[i][j]}{A}$$

where B[i][j] is 1 where the ijth pixel of the thresholded image is a foreground pixel and 0 otherwise and A is the aggregate area of the foreground pixels given by $$A = \sum_{i=1}^{n}\sum_{j=1}^{m} B[i][j].$$

The translation-invariant moments are given by:

$$\eta_{p,q} = \frac{M_{p,q}}{M_{0,0}^{\gamma}}$$

where $M_{p,q}$ is the p,qth raw moment of the character image given by:

$$M_{k,j} = \sum_{i=1}^{n} \sum_{j=1}^{m} (i-\bar{i})^k (j-\bar{j})^l B[i][j]$$

and $$\gamma = 1 + \frac{p+q}{2}.$$

The invariant moments selected for input to the BPNN are:

$\phi_1 = \eta_{2,0} + \eta_{0,2}$;

$\phi_2 = 4\eta_{1,1}^2 + (\eta_{2,0} - \eta_{0,2})^2$;

$\phi_3 = (3\eta_{3,0} - \eta_{1,2})^2 + (3\eta_{2,1} - \eta_{0,3})^2$;

$\phi_4 = (\eta_{3,0} - \eta_{1,2})^2 + (\eta_{2,1} - \eta_{0,3})^2$;

$\phi_5 = (3\eta_{2,1} - \eta_{0,3})(\eta_{2,1} - \eta_{0,3})[3(\eta_{3,0} - \eta_{1,2})^2 - 3(\eta_{2,1} - \eta_{0,3})^2] + (\eta_{3,0} - 3\eta_{1,2})(\eta_{3,0} - \eta_{1,2})[(\eta_{3,0} - \eta_{1,2})^2 - 3(\eta_{2,1} - \eta_{0,3})^2]$ and $\phi_6 = (\eta_{2,0} - \eta_{0,2})[(\eta_{3,0} - 3\eta_{1,2})^2 - (\eta_{2,1} - \eta_{0,3})^2] + 4\eta_{1,1}(\eta_{3,0} + \eta_{1,2})(\eta_{2,1} - \eta_{0,3})$ Referring again to FIG. 8, in step S2425, each feature vector is applied to the trained BPNN which outputs various candidate classes and hopefully, depending on the inputs, one very strong candidate. If there are multiple candidate characters, a best guess may be made in step S430 by combining the probability output by the BPNN with frequency of use data for the presumed language and context. Such data may be compiled from different types of material, for example, television advertising transcripts, printed material, streaming or downloaded files the Internet. One way to combine is to weight the probabilities output by the BPNN by the corresponding probabilities associated with frequency-of-use statistics.

It will be evident to those skilled in the art that the invention is not limited to the details of the foregoing illustrative embodiments, and that the present invention may be embodied in other specific forms without departing from the spirit or essential attributes thereof. For example, the text analysis presented above described a predilection for horizontally-aligned text. It is clear that the same methods could be applied to other alignments such as vertically aligned text, text along a curve, etc.

The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A device for classifying symbols in an image data stream containing symbols, comprising:

an image data storage unit with an input connected to capture data from said image data stream and an output;

an image processor, connected to said image data storage unit output, programmed to detect edges in portion of captured image data stored in said image data storage unit and form an edge image based on the detected edges, whereby said edge image contains edge pixels and non-edge pixels;

said image processor being programmed to define at least one connected component from said edge pixels, said connected components being substantially contiguous regions containing only edge pixels;

said image processor being programmed to define a subimage in said portion whose height and width are substantially the same as a maximum height and width of said at least one connected component; and said image processor being programmed to classify said subimage, whereby a best match between a symbol set and said subimage is identified.

2. A device as in claim 1, wherein said image processor is further programmed such that the edge pixels from which said at least one connected component is defined are not completely contiguous.

3. A device as in claim 1, wherein said image processor is further programmed to mark as edge pixels, non-edge pixels whose neighborhoods contain more than a specified number of edge pixels, whereby small gaps between separate contiguous regions containing only edge pixels are closed.

4. A method for classifying symbols in an image data stream containing symbols, comprising:

applying an edge detection filter to an image to identify edge pixels in said image;

forming connected components from said edge pixels;

defining symbol-bounding regions each containing a corresponding one of said connected components; and classifying subimages of said image, each coinciding with a respective one of said symbol-bounding regions.

5. A method as in claim 4, wherein defining includes defining symbol-bounding regions that are convex polygons.

6. A method as in claim 4, further comprising closing gaps between contiguous groups of said edge pixels prior to said forming.

7. A method for classifying text in an image data stream containing symbols, comprising:

applying an edge detection filter to an image to identify edge pixels in said image;

forming connected components from edge pixels;

defining text regions based on said forming such that each of said text regions bounds multiple ones of said connected components;

partitioning said text regions based on spaces between said connected components so as to identify individual character regions of said image; and classifying subimages of said image, each coinciding with a respective one of said individual character regions.

8. A method as in claim 7, wherein partitioning includes generating a projection of said subimages and partitioning said text regions based on generating.

9. A method as in claim 7, wherein forming connected components is such that gaps between contiguous groups of said edge pixels are closed under specified conditions.

10. A method as in claim 9, wherein said specified conditions includes an arrangement of said edge pixels being such that a dilation followed by an erosion of a result of said applying would prevent a gap between said contiguous groups from forming.

11. A device for classifying symbols in an image data stream containing symbols, comprising:

an image processor connectable to said image data stream to extract an image therefrom and programmed to apply an edge detection filter to said image to identify edge pixels in said image;

said image processor being further programmed to form connected components from said edge pixels;

said image processor being further programmed to define symbol regions, each containing a one of said connected components;

said image processor being further programmed to classify subimages of said image, each coinciding with a respective one of said symbol regions.

12. An image processor for classifying text in an image data stream containing symbols, comprising:

an image processing computer connectable to an image data stream to extract an image and programmed to apply an edge detection filter to said image to identify edge pixels in said image;

said image processing computer being further programmed to form connected components from edge pixels resulting from an application of said edge detection filter;

said image processing computer being further programmed to define text regions based on said forming such that each of said text regions bounds multiple ones of said connected components;

said image processing computer being further programmed to partition said text regions based on breaks between said connected components so as to identify individual character regions of said image; and said image processing computer being further programmed to classify subimages of said image, each coinciding with a respective one of said individual character regions.

13. A method as in claim 12, wherein said image processing computer is programmed to generate a projection of said subimages and partition said text regions responsively to said projection.

14. A method as in claim 12, wherein said image processing is programmed to form connected components such that gaps between contiguous said edge pixels are closed under specified conditions.

15. A method as in claim 14, wherein said specified conditions include an arrangement of said edge pixels which is such that a dilation followed by an erosion of said result of said application of said edge detection filter would prevent a gap between said contiguous groups from forming.

16. A method as in claim 12, wherein said image processing computer is programmed to sharpen said image prior to applying said edge detecting filter.

* * * * *